(12) United States Patent
Qureshi

(10) Patent No.: US 12,334,767 B2
(45) Date of Patent: Jun. 17, 2025

(54) SUPERCAPACITOR BASED ENERGY STORAGE DEVICE

(71) Applicant: KILOWATT LABS, INC., New York, NY (US)

(72) Inventor: Waseem Ashraf Qureshi, Dubai (AE)

(73) Assignee: Kilowatt Labs, Inc., New York, NY (US)

( * ) Notice: Subject to any disclaimer, the term of this patent is extended or adjusted under 35 U.S.C. 154(b) by 700 days.

(21) Appl. No.: 17/221,480

(22) Filed: Apr. 2, 2021

(65) Prior Publication Data
US 2021/0249883 A1  Aug. 12, 2021

Related U.S. Application Data

(63) Continuation of application No. 16/905,169, filed on Jun. 18, 2020, now abandoned, which is a
(Continued)

(51) Int. Cl.
*H02J 7/00* (2006.01)
*H01G 11/10* (2013.01)
(Continued)

(52) U.S. Cl.
CPC ............ *H02J 7/0069* (2020.01); *H01G 11/10* (2013.01); *H01M 10/0525* (2013.01);
(Continued)

(58) Field of Classification Search
CPC ...... H02J 7/0069; H02J 7/0013; H02J 7/0018; H02J 7/345; H02J 7/342; H01G 11/10;
(Continued)

(56) References Cited

U.S. PATENT DOCUMENTS 5,710,504 A * 1/1998 Pascual ............... H02J 7/0018
307/77
5,754,732 A   5/1998 Vlahu
(Continued)

FOREIGN PATENT DOCUMENTS

CN         1462107       12/2003
CN      201041953 Y      3/2008
(Continued)

OTHER PUBLICATIONS

Bazinet et al., "Supercapacitors are easy to charge, back up and balance," Application of Electronic Technology, ITU Micro, 2014 40(10):7-8, 4 pages (with English translation).
(Continued)

*Primary Examiner* — Stacy Whitmore
(74) *Attorney, Agent, or Firm* — Fish & Richardson P.C.

(57) ABSTRACT

An energy storage device includes a charge storage assembly, an auxiliary storage element, and a charge control circuit. The charge storage assembly includes an array of supercapacitors coupled in series, a plurality of batteries, and a charge retention circuit. Each of the plurality of batteries is electrically coupled to a corresponding supercapacitor in the array of supercapacitors. The charge retention circuit is configured to maintain a charge state of at least one supercapacitor in the array of supercapacitors when the at least one supercapacitor is in an idle state. A charge control circuit is configured to selectively transfer charge between the at least one supercapacitor in the array of supercapacitors and the auxiliary storage element.

19 Claims, 10 Drawing Sheets

Related U.S. Application Data continuation of application No. 15/490,409, filed on Apr. 18, 2017, now abandoned.

(60) Provisional application No. 62/394,532, filed on Sep. 14, 2016.

(51) Int. Cl.
*H01M 10/0525* (2010.01)
*H01M 10/42* (2006.01)
*H01M 16/00* (2006.01)
*H02J 7/34* (2006.01)

(52) U.S. Cl.
CPC ......... *H01M 10/425* (2013.01); *H01M 16/00* (2013.01); *H02J 7/0013* (2013.01); *H02J 7/0018* (2013.01); *H02J 7/345* (2013.01); *H01M 2010/4271* (2013.01); *H01M 2220/10* (2013.01); *H02J 7/342* (2020.01); *Y02E 60/13* (2013.01)

(58) Field of Classification Search
CPC ........... H01M 10/0525; H01M 10/425; H01M 16/00; H01M 2010/4271; H01M 2220/10; Y02E 60/13; Y02E 60/10; Y02T 10/70
See application file for complete search history.

(56) References Cited

U.S. PATENT DOCUMENTS

| | | | |
|---|---|---|---|
| 5,836,972 A | 11/1998 | Stendahl et al. | |
| 6,096,062 A * | 8/2000 | Silvian ................. | A61N 1/3937 607/5 |
| 6,842,375 B1 | 1/2005 | Raszka | |
| 8,638,010 B2 | 1/2014 | Ly | |
| 2001/0048307 A1* | 12/2001 | Maki ....................... | B60L 58/18 324/387 |
| 2002/0041502 A1* | 4/2002 | Ulinksi ....................... | H02J 3/32 363/37 |
| 2003/0011965 A1* | 1/2003 | Shiue ....................... | H01G 11/46 361/502 |
| 2003/0222502 A1 | 12/2003 | Takahashi et al. | |
| 2004/0246635 A1* | 12/2004 | Morita ................... | H02J 7/0018 361/1 |
| 2005/0007799 A1* | 1/2005 | Schreiber .............. | H02M 5/458 363/132 |
| 2006/0241876 A1 | 10/2006 | Ingram et al. | |
| 2008/0094042 A1* | 4/2008 | Ferrario .................... | H02J 7/00 323/234 |
| 2008/0211456 A1 | 9/2008 | Bolz et al. | |
| 2009/0140694 A1 | 6/2009 | Zeng | |
| 2009/0167250 A1 | 7/2009 | Dai et al. | |
| 2009/0243540 A1* | 10/2009 | Choi ................. | H02J 7/007194 320/150 |
| 2009/0278488 A1* | 11/2009 | Choi ..................... | H02J 7/0016 320/103 |
| 2010/0007308 A1 | 1/2010 | Lee et al. | |
| 2010/0131217 A1 | 5/2010 | Ichikawa | |
| 2010/0146333 A1* | 6/2010 | Yong ................... | G06F 11/1441 713/340 |
| 2010/0315046 A1 | 12/2010 | Trainor et al. | |
| 2011/0125337 A1 | 5/2011 | Zavadsky et al. | |
| 2012/0235473 A1* | 9/2012 | Jiang ...................... | B60L 58/20 307/9.1 |
| 2012/0235624 A1 | 9/2012 | Sisk et al. | |
| 2013/0119945 A1 | 5/2013 | Petersen et al. | |
| 2013/0127419 A1 | 5/2013 | Coenen et al. | |
| 2013/0266824 A1 | 10/2013 | Cowperthwaite et al. | |
| 2014/0015469 A1 | 1/2014 | Beaston et al. | |
| 2014/0084817 A1 | 3/2014 | Bhavaraju et al. | |
| 2014/0103855 A1 | 4/2014 | Wolter | |
| 2014/0225569 A1 | 8/2014 | Yamazaki et al. | |
| 2014/0312828 A1 | 10/2014 | Vo et al. | |
| 2016/0172868 A1 | 6/2016 | Sequeira et al. | |
| 2016/0237790 A1 | 8/2016 | Williams | |
| 2017/0110893 A1 | 4/2017 | Cao | |
| 2017/0267105 A1* | 9/2017 | Fratelli ................... | B60L 15/20 |
| 2018/0076644 A1 | 3/2018 | Qureshi | |
| 2020/0335992 A1 | 10/2020 | Qureshi | |
| 2024/0268096 A1* | 8/2024 | Okamoto ............... | H10B 12/50 |

FOREIGN PATENT DOCUMENTS

| | | | | |
|---|---|---|---|---|
| CN | 101164215 | | 4/2008 | |
| CN | 101606300 | | 12/2009 | |
| CN | 103025557 | | 4/2013 | |
| CN | 103534133 | | 1/2014 | |
| CN | 103534134 | | 1/2014 | |
| CN | 203859574 U | | 10/2014 | |
| CN | 105210258 | | 12/2015 | |
| EP | 1366948 | | 12/2003 | |
| JP | 2001177914 | | 6/2001 | |
| JP | 2001268815 | | 9/2001 | |
| JP | 2003235173 | | 8/2003 | |
| JP | 2005080466 | | 3/2005 | |
| JP | 2007221954 | | 8/2007 | |
| JP | 2008072842 | | 3/2008 | |
| JP | 2009005458 | | 1/2009 | |
| JP | 2009055687 | | 3/2009 | |
| JP | 2014170741 | | 9/2014 | |
| JP | 2015518233 | | 6/2015 | |
| KR | 10-2010-0093464 | | 8/2010 | |
| KR | 101602530 | | 3/2016 | |
| WO | WO 2003032464 | | 4/2003 | |
| WO | WO-2007082168 A2 * | | 7/2007 | ............ H01M 10/46 |
| WO | WO-2010115006 A1 * | | 10/2010 | ................ H02J 3/14 |
| WO | WO-2016209378 A2 * | | 12/2016 | ................ B60L 1/00 |

OTHER PUBLICATIONS

Extended European Search Report in European Appln. No. 17851246.3, mailed on Apr. 14, 2020, 7 pages.

He et al., "Voltage stability control of photovoltaic power generation system based on double-parallel Boost-Buck circuit," Electric Power Automation Equipment, Jul. 2010, 30(7):100-103, 10 pages (with machine translation).

International Preliminary Report on Patentability in International Appln. No. PCT/US2017/045848, mailed on Mar. 28, 2019, 8 pages.

International Search Report and Written Opinion in International Appln. No. PCT/US2017/045848, mailed on Nov. 13, 2017, 11 pages.

* cited by examiner

SUPERCAPACITOR BASED ENERGY STORAGE DEVICE

CROSS-REFERENCE TO RELATED APPLICATIONS

This application is a continuation application of U.S. patent application Ser. No. 16/905,169, filed on Jun. 18, 2020, which is a continuation application of U.S. patent application Ser. No. 15/490,409, filed on Apr. 18, 2017, which claims priority to U.S. Provisional Patent Application No. 62/394,532, filed Sep. 14, 2016, entitled "SUPERCAPACITOR BASED ENERGY STORAGE DEVICE AND METHOD," the entirety of which is incorporated by reference herein.

FIELD

This disclosure generally relates to supercapacitor based energy storage devices and methods for controlling supercapacitor based energy storage devices. More particularly, the disclosed systems and methods balance current flow of the supercapacitor assembly, reduce self-discharge rate, and enhance the specific energy of a supercapacitor based energy storage device.

BACKGROUND

In recent years, climate change and global warming have led to an increased interest in energy storage for transitioning to electric transportation, for the grid to integrate greater renewable generation and to provide renewable based power to the billions of people with still no access to electricity, and transitioning those dependent on diesel or kerosene based energy to renewable based energy. Energy storage, both chemical and non-chemical and electrostatic has existed for more than a century with widespread usage. However, the demands of applications like transportation, grid storage and off-grid power are quite different from what batteries are currently used for, and have resulted in a new set of challenges.

In the case of automotive applications, to gain widespread acceptance by automotive consumers, electric vehicles have to eliminate problems such as range anxiety, temperature effect, cycle life and cost. To be effective for grid storage solutions, batteries have to address the problems of cost (compared to fossil fuel based alternatives), efficiency, temperature effect, cycle life, capacity fade, memory effect, rate of charge, etc. To be deployed in off-grid solutions, batteries have to address the problems of cost, temperature effect, rate of charge, rate of discharge, cycle life, safety, efficiency and maintenance.

Development in materials science, commercial models, manufacturing methods are contributing to improved battery performance and economics. These efforts are mostly focused on chemical batteries. However, the progress is slow and increments are marginal. Exponential improvements are necessary to meet the challenges of climate change and global warming. Lithium ion, advanced lead acid, flow, aqueous and hydrogen cells are amongst the many different types of batteries being tested and developed, though, limitations with the materials of the chemical storage media is hampering progress.

SUMMARY

In one aspect, the present disclosure provides an energy storage device having a charge storage assembly including an array of supercapacitors and an auxiliary storage element. Further, a charge control circuit configured to provide a charging current to the array of supercapacitors during a charging operation is provided, wherein the charge control circuit is configured to selectively transfer charge between the at least one supercapacitor in the array of supercapacitors and the auxiliary storage element.

In another aspect, an energy storage device is provided to have a charge storage assembly with an array of supercapacitors coupled in series; and a plurality of batteries, wherein each of the plurality of batteries is electrically coupled to a corresponding supercapacitor in the array of supercapacitors. A charge retention circuit configured to maintain a charge state of each supercapacitor in the array of supercapacitors when each supercapacitor is in an idle state is also provided.

And in yet another aspect, the disclosure provides for an energy storage device, having a charge storage assembly with an array of supercapacitors coupled in series; and a plurality of batteries, wherein each of the plurality of batteries is electrically coupled to a corresponding supercapacitor in the array of supercapacitors. In addition, the disclosure provides a plurality of charge retention circuits, wherein each of the plurality of charge retention circuits is coupled to a corresponding supercapacitor in the array of supercapacitors, and wherein each of the plurality of charge retention circuits are configured to maintain a charge state of the corresponding supercapacitor in the array of supercapacitors when the corresponding supercapacitor is in an idle state. Further provided is an auxiliary storage element, and a plurality of charge control circuits configured to selectively transfer charge between at least one supercapacitor in the array of supercapacitors and the auxiliary storage element.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
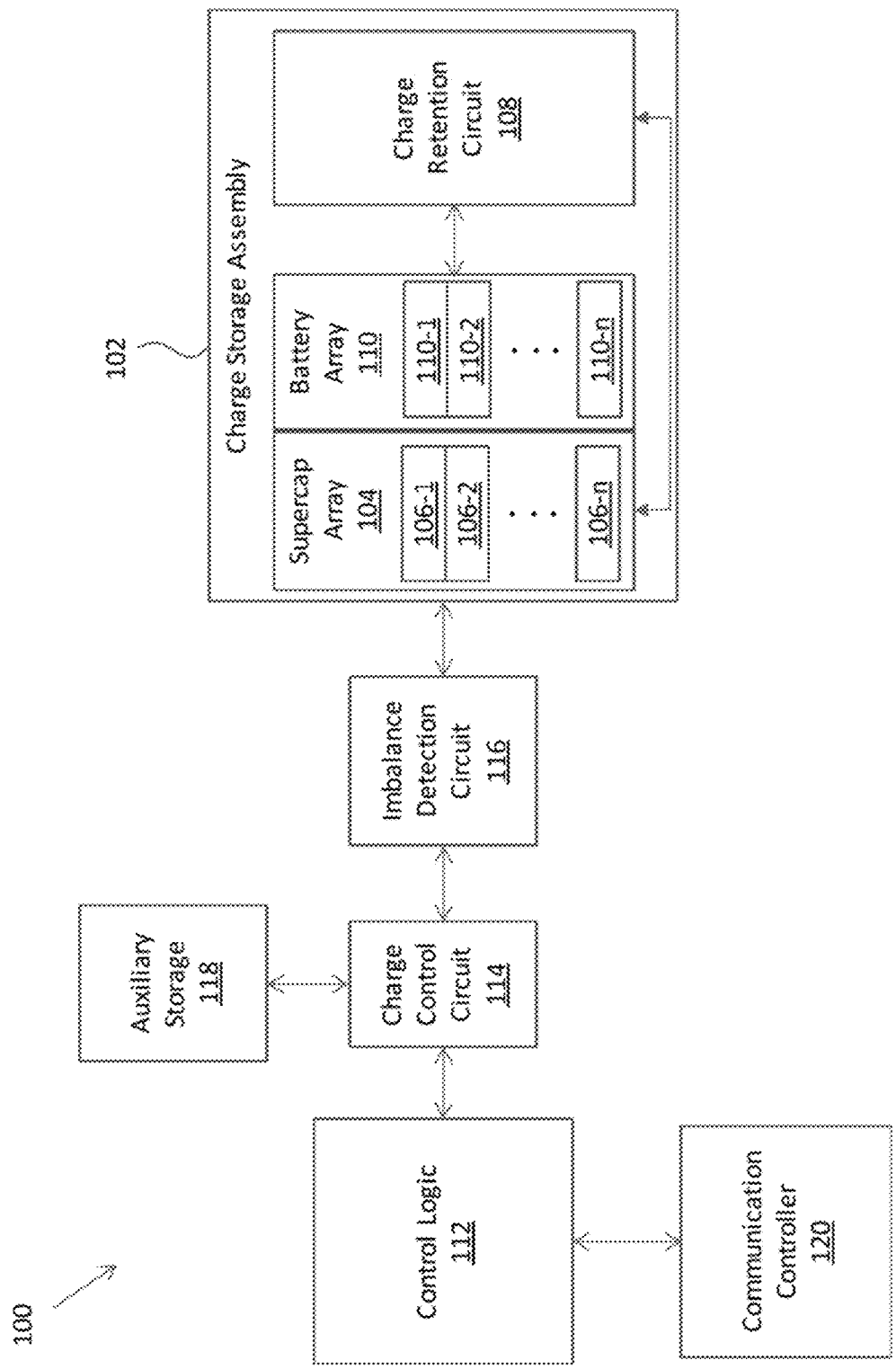
FIG. 1 illustrates a system for controlling an array of supercapacitors, in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. Terms concerning electrical coupling and the like, such as "coupled," "connected" and "interconnected," refer to a relationship wherein structures communicate with one another either directly or indirectly through intervening structures unless expressly described otherwise. In addition, the present disclosure may repeat reference numerals and/or letters in the various examples. This repetition is for the purpose of simplicity and clarity and does not in itself dictate a relationship between the various embodiments and/or configurations discussed.

The disclosed systems and methods simplify balancing current, reduce self-discharge, and optimize the regulation of energy density at individual supercapacitors. A supercapacitor, which is well known and commercially available from a variety of sources, is a high-capacity electrochemical capacitor with capacitance values much higher than other capacitors (but lower voltage limits) that bridge the gap between electrolytic capacitors and rechargeable batteries. The systems and methods described herein allow supercapacitors to be used where only conventional batteries could previously be used. Due to the inherent advantages of supercapacitors over conventional batteries, and by incorporating the disclosed systems and methods, the supercapacitor assembly delivers a viable and significantly improved alternative to conventional batteries resulting in enabling widespread deployment and transition from fossil fuel to renewable energy.

In some embodiments, a plurality of supercapacitors are connected in series to form an array with a predetermined VDC (voltage direct-current) output. Each supercapacitor in the array can be embedded with a battery (such as an Lithium Iron Phosphate ("LFP") battery) of an amount equivalent to a predetermined percentage of the storage capacity of the supercapacitor. In some embodiments, microcontroller-based hardware is connected to each supercapacitor and is configured to perform current balancing, charge retention and optimization and regulation of electrolytic density. Although some embodiments are discussed herein having a specific number of supercapacitors, the number of supercapacitors is not limiting and each of the discussed embodiments can include fewer or more supercapacitors, as will be understood by a person of ordinary skill in the art.

In some embodiments, each array of supercapacitors includes a plurality of supercapacitors connected in series that are chargeable at very high currents, such as, for example, 800 A-900 A. Imbalances that may arise during the charge cycle due to manufacturing tolerances of the individual supercapacitors (±20%). In some embodiments, the imbalances are corrected by one or more circuit elements coupled to the array of supercapacitors. For example, during the charge cycle, when a charging source is connected to the array of supercapacitors, the microcontroller can monitor the voltage of each individual supercapacitor for current balancing. When the microcontroller detects a supercapacitor that has reached full charge, excess energy is drawn from the fully charged supercapacitor and transferred to an auxiliary buffer. The excess energy can be supplied from the auxiliary buffer to one or more supercapacitors that are still under charge. This process advantageously occurs with no disruption in the charge cycle. Thus, the disclosed systems and methods advantageously control the charging of the supercapacitors to maintain stability under charge, increase charging efficiency, and shorten charging time.

Supercapacitors have a high self-discharge rate when idle (48 hours-80%). In some embodiments, to reduce the discharge rate, current is provided from a battery that curtails leakage current and reduces the self-discharge rate. For example, in some embodiments, an LFP battery can generate a leakage current to provide an increase in self-discharge from 48 hours to 14 days. In some embodiments, the microcontroller is configured to monitor and control the charge retention process.

Supercapacitors typically have low specific energy (energy per unit mass or Wh/kg) compared to chemical batteries. Specific energy of supercapacitors varies, for example, between 5 Wh/kg to 30 Wh/kg which is less than the 100+Wh/kg of some chemical batteries. Low specific energy increases supercapacitor footprint and can make supercapacitors unsuitable for many commercial applications including transportation, behind-the-meter storage, storage for consumer devices, etc. In some embodiments, to increase the specific energy of the array of supercapacitors, each supercapacitor is charged during a charge cycle with very large energy bursts along with a sequence of discharge pulses applied for very short periods to the electrolytic layer. This set of pulsating bursts of charge and discharge results in achieving maximum charge of the electrolytic layer of each supercapacitor with the resultant increase in specific energy of the core module. In some embodiments, the specific energy to the core module is approximately 80 Wh/Kg.

In some embodiments, a communication module that can communicate on multiple protocols is attached to each supercapacitor as well as to the control logic and provides data of each supercapacitor. The data can include, but is not limited to, voltage, current, temperature, and balance and is provided in a manner that enables another automation system to read this data. In addition, the data gathered by the communication module can include over-charge, reverse polarity, over-temperature, short circuit, capacitor imbalance, and/or other data. The communication module is configured to signal an alarm if any event or events occur outside one or more preset limits.

The disclosed systems and methods take advantage of the ability of supercapacitors to be charged in less than 30 seconds without affecting the cycle life of supercapacitors and can be deployed in electric vehicles or utility grade frequency regulation. A network of fast charging stations also enables electric vehicles running on supercapacitor based storage banks to be recharged quickly at such stations (similar to how cars get refueled at gas stations) thereby eliminating the problem of extended range that currently exists in electric vehicles due to their inability to charge quickly, which necessitates the usage of large battery banks.

Storing power in the electrical grid (e.g., "grid storage) requires batteries to be able to respond quickly to changes in frequency. The disclosed systems and methods can be deployed in such systems in order to address the need of fast frequency response. Further, the disclosed systems and methods enable deep cycle and long duration discharge and can be deployed in applications requiring deep cycle discharge, such as long duration grid storage.

The disclosed systems and methods also enable capital investments to be lowered. For example, with a Depth-of-Discharge ("DOD") of 100% and DC to DC round-trip efficiency of 99.1%, the delivered and rated capacity of the disclosed systems are almost the same, which allows for a significant reduction in the capacity required when compared to systems utilizing chemical batteries.

The cycle life of the system of the current invention is 1 million cycles at 100% DOD with negligible capacity fade and impact of charge/discharge rates. Combined with very low maintenance requirements, the system of the present invention delivers power and energy at an unmatched cost per cycle.

The disclosed systems and methods further enables usage in most environments. For example, with a temperature tolerance range that is higher than most chemical batteries, the disclosed systems can be deployed in extremely harsh environments without cooling or heating, resulting in less oversight and maintenance. In addition, a charge retention circuit can control a small percentage of embedded LFP battery to supply current to reduce charge leakage and increase self-discharge time.

These and other objects, advantages, and features of the disclosed systems and methods will become apparent to those of ordinary skill in the art from the detailed description and the accompanying drawings. It should be understood, however, that the detailed description and accompanying drawings, while indicating preferred embodiments, are given by way of illustration and not of limitation. Many changes and modifications may be made within the scope of the present invention without departing from the spirit thereof, and the invention includes all such modifications.

FIG. 1 illustrates one example of a system for controlling an array of supercapacitors, in accordance with some embodiments. As shown in FIG. 1, system 100 includes a charge storing assembly 102 comprising an array 104 of supercapacitors 106-1:106-$n$ (hereinafter "supercapacitors 106"). Array 104 is coupled to a charge retention circuit 108. Each of the supercapacitors 106 is also coupled to a battery 110-1:110-$n$ (hereinafter "batteries 110"). In some embodiments, each of the batteries 110 is a lithium ferrophosphate (LFP) battery, although one of ordinary skill in the art will understand that other types of batteries may be implemented.

In some embodiments, charge retention circuit 108 is configured to detect voltage leakage from the supercapacitors 106 and generate a leakage current to counteract such leakage. Charge retention circuit 108 can generate a leakage current using one or more of the batteries 110. In some embodiments, each of the batteries 110 are configured to have a storage capacity equal to a predetermined percentage of the storage capacity of an associated one of the supercapacitors 106. For example, in some embodiments, each of the batteries 110 include a storage capacity equal to about 6% of the storage capacity of an associated one of the supercapacitors 106, although it will be appreciated that each of the batteries 110 can have a greater and/or lesser storage capacity.

In some embodiments, a charge control circuit 114 and an imbalance detection circuit 116 are coupled to the charge storing assembly 102. Although charge control and imbalance detection circuits 114, 116 are shown as separate circuits, a person of ordinary skill in the art will recognize that charge control circuit 114 and imbalance detection circuit 116 can be implemented on a common substrate (e.g., a printed circuit board or silicon) or on separate substrates. Charge control circuit 114 is coupled to an auxiliary storage 118, which can include an auxiliary charge storage device, such as an auxiliary supercapacitor and/or other charge storage device.

Control logic 112 is in signal communication (communicatively coupled) to charge control circuit 114, auxiliary storage 118, and communications controller 120. As described in greater detail below, in some embodiments, control logic 112 is configured to execute a current balancing algorithm and/or a charge retention algorithm. The current balancing and charge retention algorithms can be implemented by software commands that are executed by control logic 112 and/or implemented in one or more hardware circuits, as will be understood by one of ordinary skill in the art. In some embodiments, control logic 112 can include a microcontroller, a field-programmable gate array (FPGA), a programmable logic controller, any other suitable control logic, and/or any combination thereof.

In some embodiments, communication controller 120 is configured to control transmission and reception of data between control logic 112 and other device(s) or circuit(s) via one or more communication port(s). Examples of communication ports include, but are not limited to, an Ethernet port, an RS232 port, and an RS485 port having a MODBUS RTU as the communication protocol, etc. A person of ordinary skill in the art will understand that other communication ports and/or protocols can be implemented.

Figure 2:
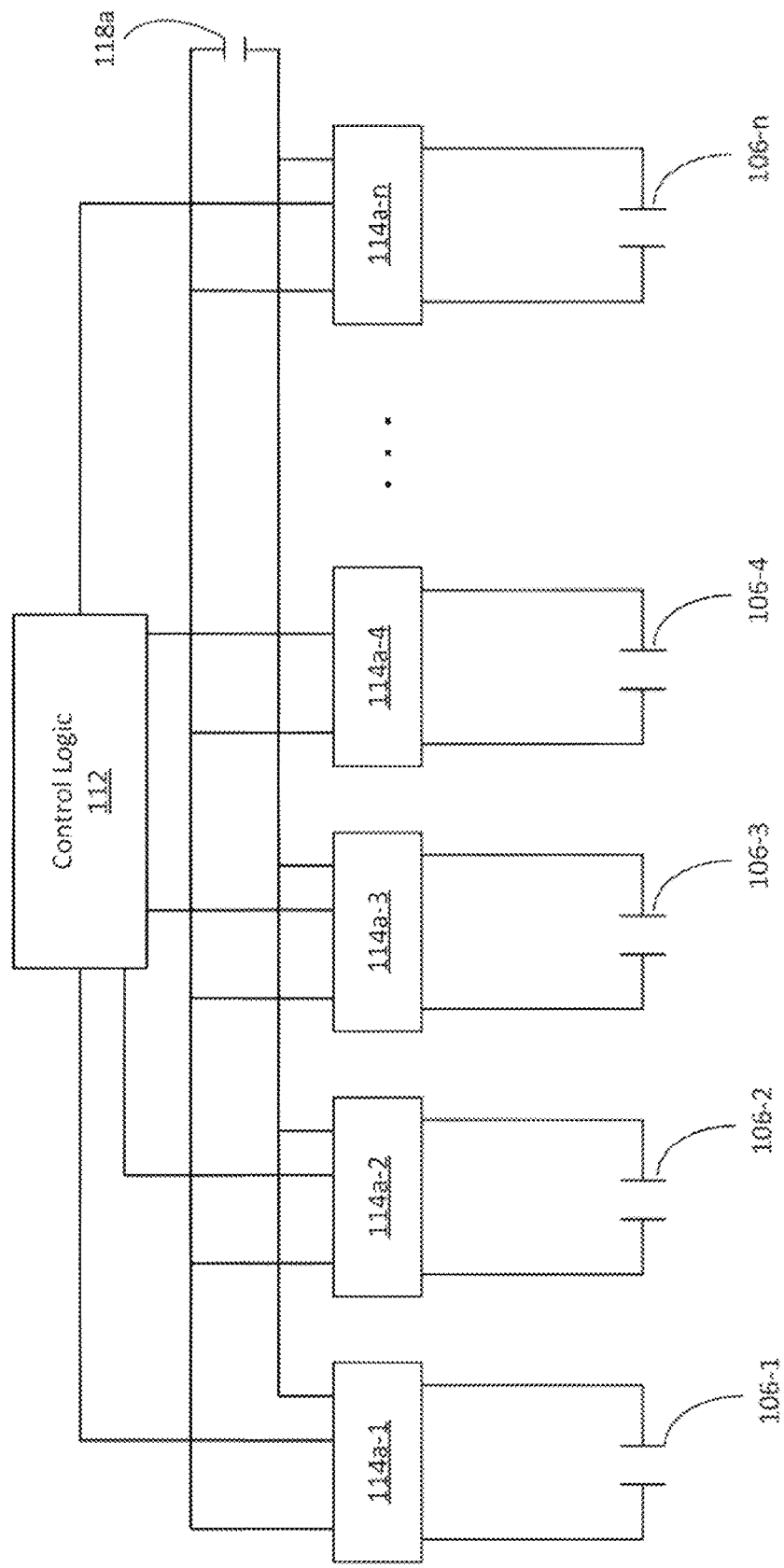
FIG. 2 illustrates a partial, but more detailed, view of the system of FIG. 1 including a plurality of charge control circuits, in accordance with some embodiments.

FIG. 2 illustrates a partial, but more detailed, view of system 100 including a plurality of charge control circuits, in accordance with some embodiments. As shown in FIG. 2, in some embodiments, a system 100$a$ includes a plurality of charge control circuits 114$a$-1:114$a$-$n$ (collectively "charge control circuits 114$a$"). Each of the charge control circuits 114$a$ is associated with and coupled to one of the supercapacitors 106 in array 104. Each charge control circuit 114$a$ is electrically coupled to control logic 112 and to auxiliary storage 118. In the illustrated embodiment, auxiliary storage 118 is a supercapacitor 106-$o$, although it will be appreciated that other embodiments and/or storage devices can be used.

Charge control circuits 114$a$ are configured to transfer charge between an associated one of the supercapacitors 106 and auxiliary storage 118. In some embodiments, charge control circuits 114$a$ are configured to transfer charge to correct one or more imbalances between supercapacitors 106. For example, in some embodiments, the charge control circuits 114$a$ can be configured to transfer charge from auxiliary storage 118 to correct an undercharge imbalance of an associated one of the supercapacitors 106 and/or can be configured to transfer charge to auxiliary storage 118 to correct an overcharge imbalance of an associated one of the supercapacitors 106.

Figure 3:
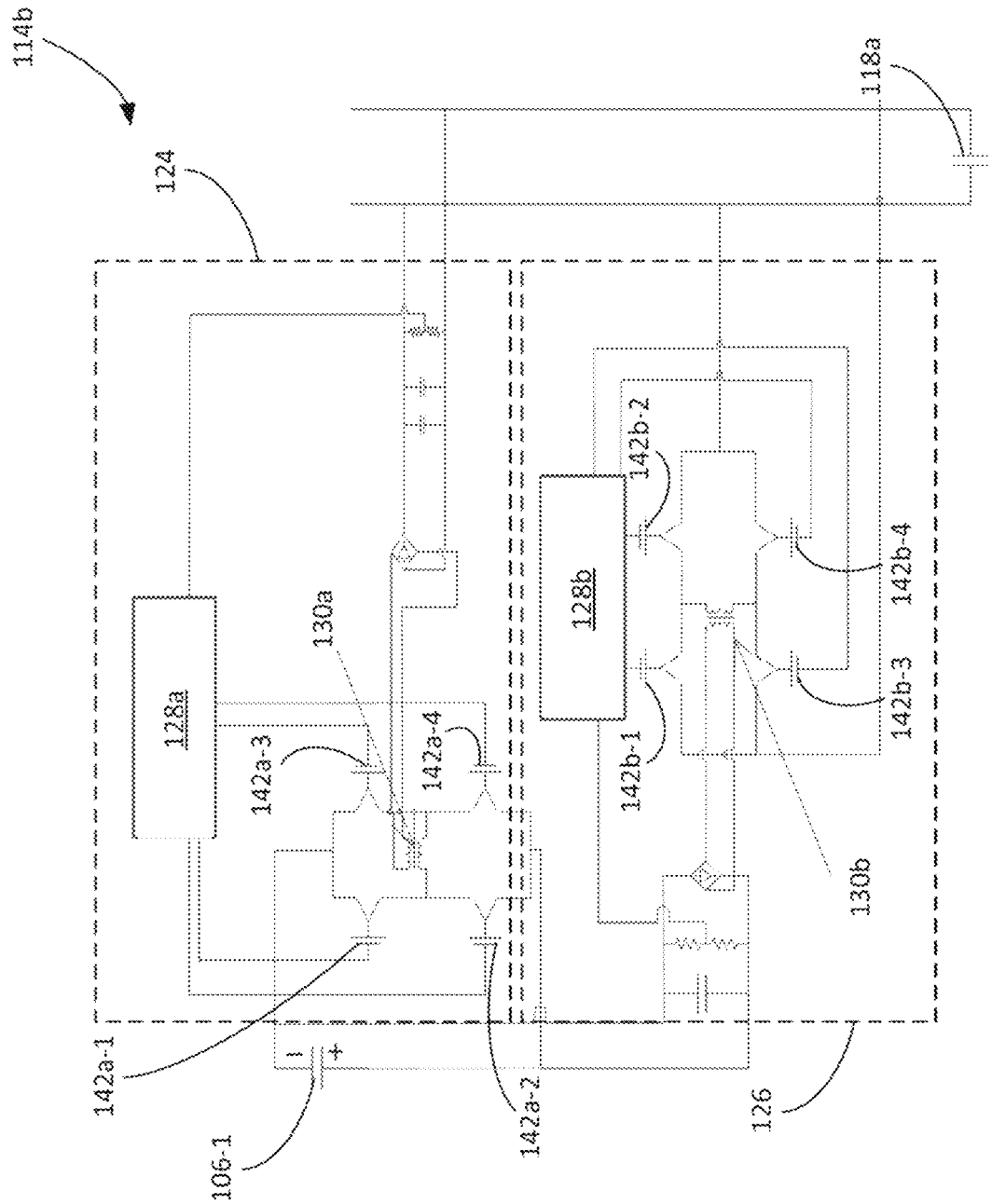
FIG. 3 illustrates an example charge control circuit, in accordance with some embodiments.

FIG. 3 illustrates one example of a charge control circuit, in accordance with some embodiments. As shown in FIG. 3, a charge control circuit 114$b$ can include an overcharge portion 124 and an undercharge portion 126. Each of the overcharge portion 124 and the undercharge portion 126 include at least a pulse-width modulation (PMW) controller 128$a$, 128$b$, a transformer 130$a$, 130$b$, and one or more insulated-gate bipolar transistors (IGBTs) 142$a$-1:142$d$-2 (collectively "IGBTs 142"). Overcharge portion 124 and/or undercharge portion 126 can each include one or more additional elements, such as capacitors, resistors, switches and/or any other suitable circuit elements. Each of overcharge portion 124 and undercharge portion 126 of charge control circuit 114$b$ are coupled to at least one of the supercapacitors 106, such as supercapacitor 106-1.

Charge control circuit 114$b$ is configured to balance charging of supercapacitor 106-1 such that supercapacitor 106-1 is not overcharged and/or undercharged with respect to other supercapacitors 106 in array 104. For example, when control logic 112 determines that supercapacitor 106-1 is overcharged with respect to other supercapacitors 106 in array 104, control logic 112 can activate the PWM controller 128a in the overcharge portion 124 of charge control circuit 114b to drain charge from supercapacitor 106-1 and transfer charge into auxiliary storage 118. The rate of drain from the supercapacitor 106-1 is selected to correct the overcharge imbalance of supercapacitor 106-1 with respect to other supercapacitors 106 in array 104.

Similarly, when control logic 112 determines supercapacitor 106-1 is undercharged with respect to other supercapacitors 106, control logic 112 activates PWM controller 128b in the undercharge portion 126 of charge control circuit 114b to transfer charge from auxiliary storage 118 to supercapacitor 106-1. Supercapacitor 106-1 receives the additional charge from auxiliary storage 118, which expedites the charging of supercapacitor 106-1 and corrects the undercharge imbalance with respect to other supercapacitors 106 in array 104.

Figure 4:
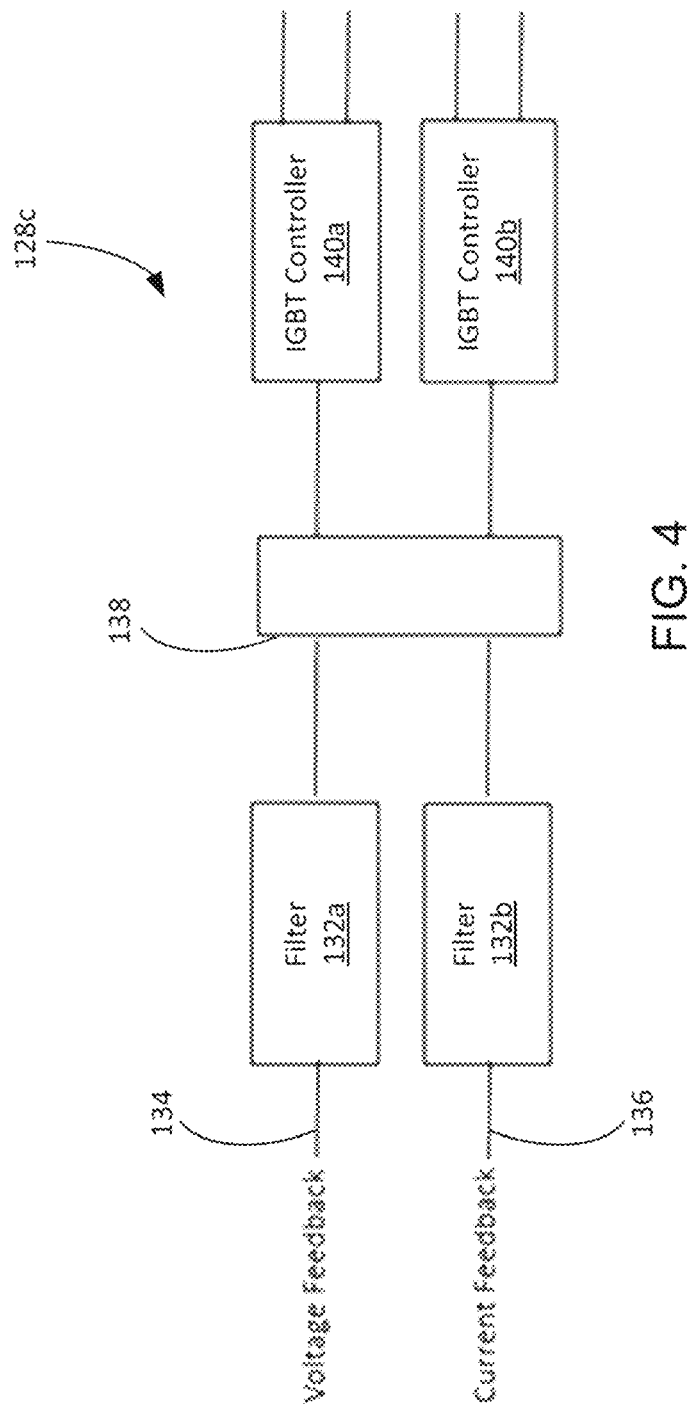
FIG. 4 illustrates an example pulse-width modulation controller, in accordance with some embodiments.

FIG. 4 illustrates an example of a PWM controller, in accordance with some embodiments. PWM controller 128c includes a first analog noise filter 132a coupled to a voltage feedback input 134 and a second analog noise filter 132b coupled to a current feedback input 136. Analog noise filters 132a, 132b are configured to filter the respective input signals 134, 136 and provide the voltage and/or current feedback signal to a digital signal processor (DSP) 138. The DSP 138 can include any suitable circuit, such as microcontroller, FPGA, PLA, embedded system, and/or any other suitable circuit. The DSP 138 is configured to receive the filtered voltage and current feedback signals and generate one or more control signals for one or more IGBT controllers 140a, 140b.

In some embodiments, IGBT controllers 140a, 140b are configured to generate control signals 144a-144d for one or more IGBTs 142 in charge control circuit 114b. For example, in the illustrated embodiment, a first IGBT controller 140a generates a first low-side IGBT control signal 144a and a second low-side IGBT control signal 144b. Similarly, in the illustrated embodiment, a second IGBT controller 140b generates a first high-side IGBT control signal 146a and a second high-side IGBT control signal 146b. Each of the low-side control signals 144a, 144b and the high-side control signals 146a, 146b are provided to one of the IGBTs 142 in one of the overcharge portion 124 or the undercharge portion 126.

IGBTs 142 are configured to control the transfer of charge between supercapacitor 106-1 and auxiliary storage 118. For example, in one embodiment, when an overcharge situation is detected, the first PWM controller 128a receives one or more control signals from control logic 112. The first PWM controller 128a generates a plurality of IGBT control signals 144a-146b as discussed above. Each of the IGBT control signals 144a-146b are provided to one of IGBTs 142a-1: 142a-4 (collectively "IGBTs 142a") in the overcharge portion 124 of charge control circuit 114b. IGBTs 142a are activated to transfer charge from supercapacitor 106-1 to auxiliary storage 118 until the overcharge imbalance has been corrected. Similarly, when an undercharge situation is detected, the second PWM controller 128b receives one or more control signals from control logic 112. The second PWM controller 128b generates a plurality of IGBT control signals 144a-146b and provides each of the IGBT control signals 144a-146b to one of IGBTs 142b-1:142b-4 (collectively "IGBTs 142b") in the undercharge portion 126. IGBTs 142b are activated by control signals 144a-146b to transfer charge from auxiliary storage 118 to supercapacitor 106-1 until the undercharge imbalance has been corrected.

Figure 5:
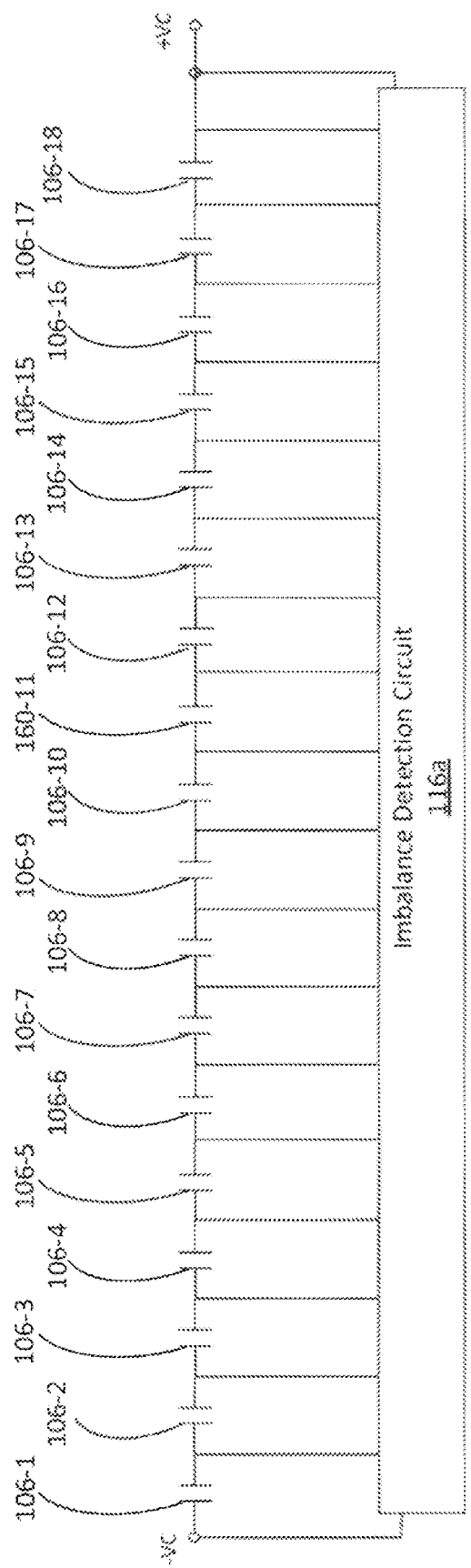
FIG. 5 illustrates a partial, but more detailed, view of the system of FIG. 1 including an example imbalance detection circuit, in accordance with some embodiments.

FIG. 5 illustrates a partial, but more detailed view, of the system 100 including an example imbalance detection circuit coupled to each of the supercapacitors 106 in array 104, in accordance with some embodiments. As shown in FIG. 5, an imbalance detection circuit 116a is coupled to each of supercapacitors 106. Imbalance detection circuit 116a is configured to monitor the charge status of supercapacitors 106 and determine the charge state of a selected one of supercapacitors 106 with respect to other supercapacitors 106 in array 104. For example, in some embodiments, imbalance detection circuit 116a is configured to detect an overcharge imbalance and/or an undercharge imbalance in supercapacitors 106. Imbalance detection circuit 116a can control charge control circuit 114 and/or can provide feedback to control logic 112 for generating control signals for charge control circuit 114.

Figure 6:
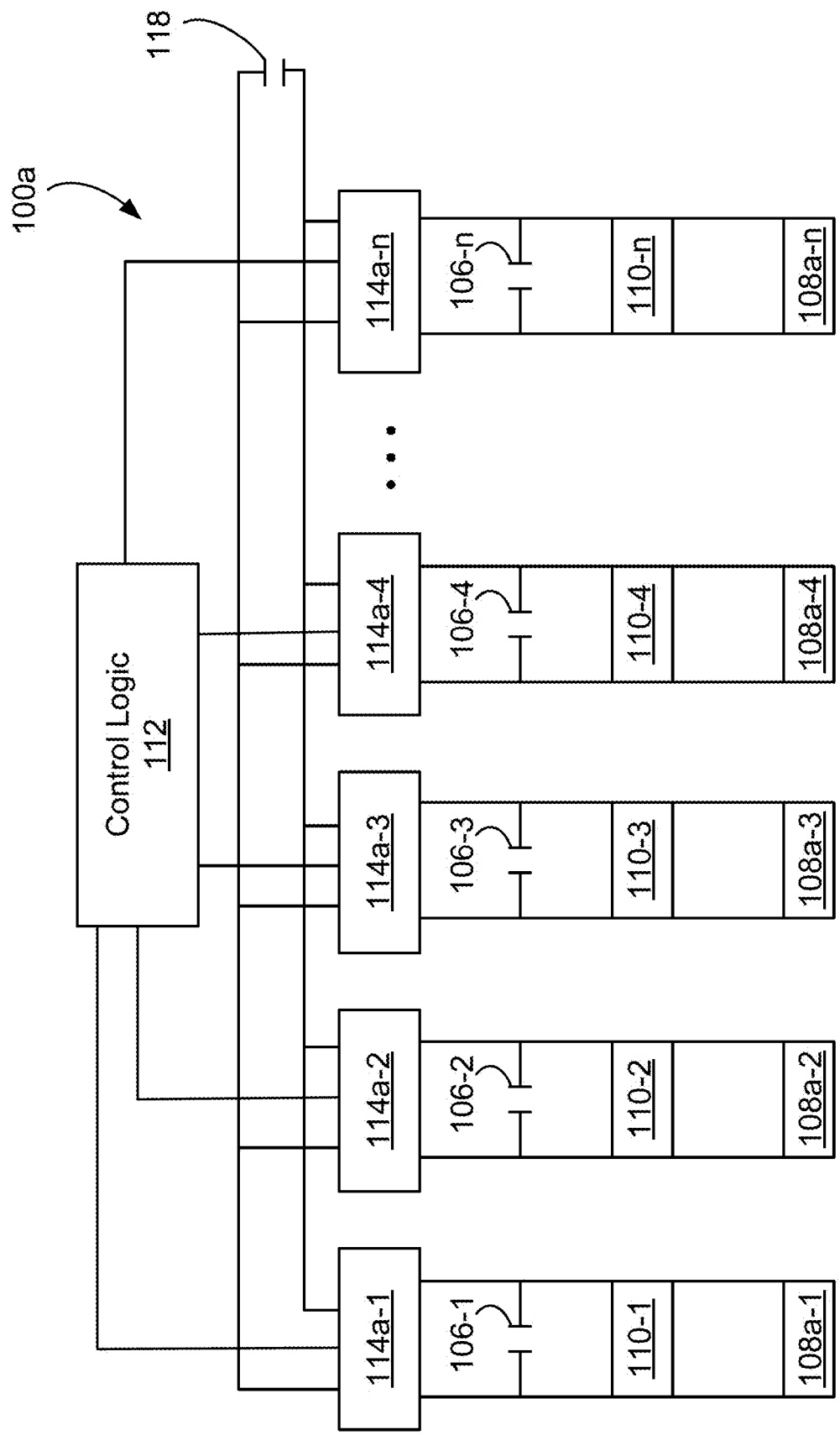
FIG. 6 illustrates a partial, but more detailed, view of the system of FIG. 1 including an example charge retention circuit, in accordance with some embodiments.

FIG. 6 illustrates a partial, but more detailed, view of the system 100 including an example charge retention circuit, in accordance with some embodiments. As shown in FIG. 6, in some embodiments, system 100a includes a plurality of charge retention circuits 108a-1:108-n (collectively "charge retention circuits 108"). Each of the charge retention circuits 108 is coupled to an associated one of supercapacitors 106 in array 104.

Each of the charge retention circuits 108a are further coupled to one of the batteries 110 associated with the same supercapacitor 106 as charge retention circuit 108a. Batteries 110 are configured to supply a leakage current to an associated one of supercapacitors 106 when a none-use/idle condition of the selected one of supercapacitors 106 is detected. For example, in some embodiments, when an idle condition of one or more supercapacitors 106 is detected, control logic 112 activates charge retention circuits 108a associated with the idle supercapacitors 106. Activated charge retention circuits 108a draw a leakage current from associated batteries 110 and supply leakage current to the associated one of supercapacitors 106. The leakage current is a predetermined current specified during the manufacture of supercapacitors 106 that is configured to maintain supercapacitors 106 at the current charge level.

In some embodiments, each of the charge retention circuit 108a is configured to generate a leakage current by switching two or more circuit elements, such as MOSFETs (metal-oxide semiconductor field-effect transistor). Each of the charge retention circuits 108a can be further configured for PWM current regulation at a current equal to the generated leakage current. The PWM can be configured to compensate for circuit specific variance in each of the supercapacitors 106. Each of the charge retention circuits 108a are configured to regulate the leakage current to maintain the leakage current below a predetermined maximum leakage current and prevent supercapacitors 106 from transitioning to a charging state.

In some embodiments, when supercapacitors 106 transition from an idle state to an active state (e.g., active charge and/or discharge), the associated one of the charge retention circuits 108a stops supplying the leakage current from batteries 110. Charge retention circuits 108a can detect the transition from idle to active directly and/or can receive one or more signals from control logic 112 indicating the associated supercapacitors 106 is/are in an active state.

Figure 7:
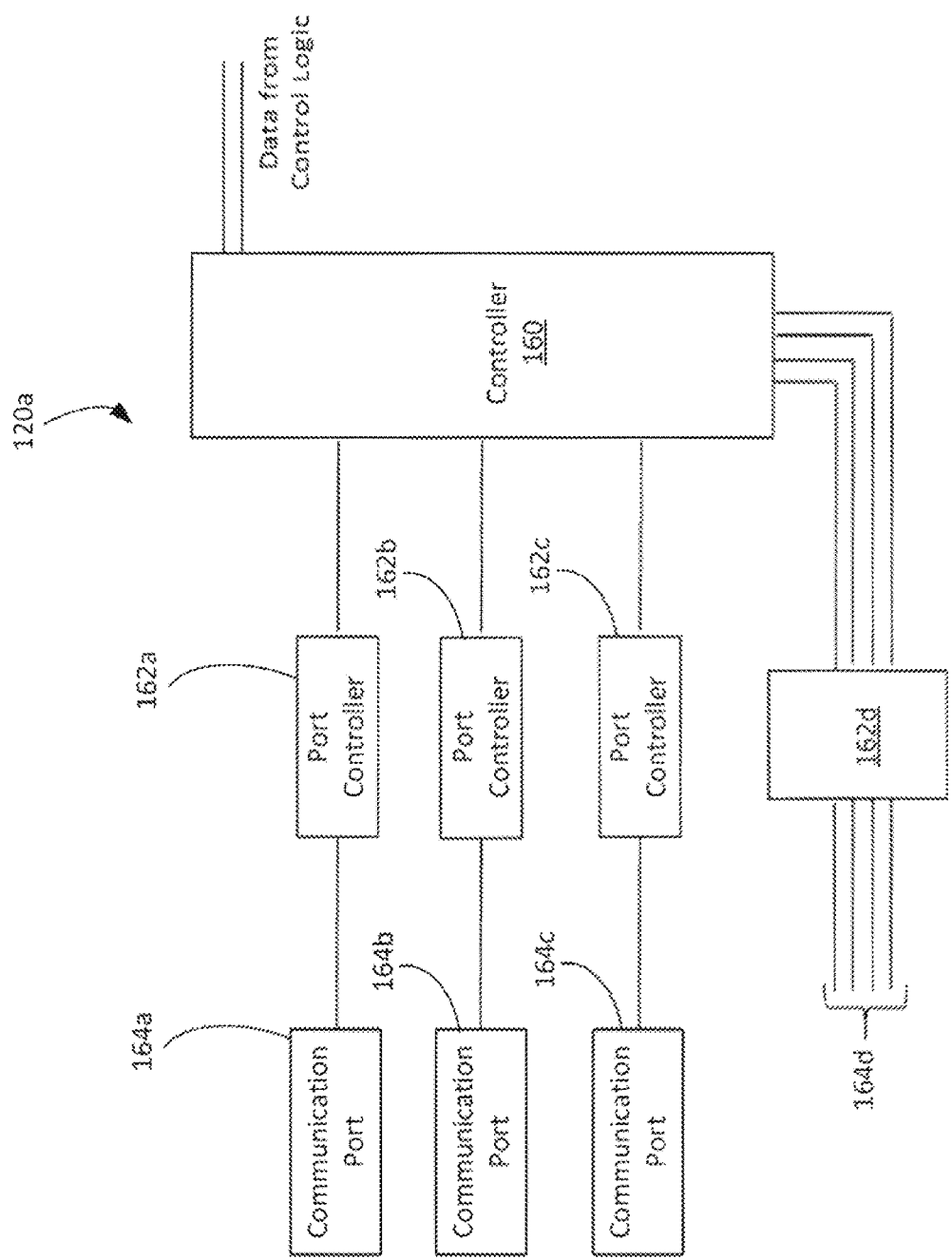
FIG. 7 illustrates an example communication module, in accordance with some embodiments.

FIG. 7 illustrates one example of a communication controller, in accordance with some embodiments. As shown in FIG. 5, in some embodiments, a communication controller 120a includes a controller 160 configured to control communication between external hardware, such as chargers, inverters, and/or other power management equipment, and system 100. Controller 160 can include any suitable controller, such as, for example, a microcontroller, an FPGA, a PLA, an embedded circuit, and/or any other suitable controller. Controller 160 is coupled to a plurality of port controllers 162a-162d (collectively "port controllers 162"). Each of port controllers 162 is coupled to a respective communication port 164a-164d (collectively "communication ports 164"). Although four port controllers 162 and four communication ports 164 are illustrated, it will be appreciated that communication controller 120a can include a greater and/or lesser number of port controllers 162 and/or communication ports 164.

In various embodiments, port controllers 162 and communication ports 164 can be configured for any suitable communication protocol, such as, for example, Ethernet communication, RS485, RS232, 4-way dry contacts, and/or any other suitable communication protocol. In some embodiments, the 4-way dry contact is a pre-programmable isolated 4-way dry contact.

In some embodiments, controller 160 extracts data over inter-integrated circuit ("I²C") protocol from control logic 112, although it will be appreciated that other protocols can be used. The extracted data can include, but is not limited to, RTC (real-time communications), temperature, voltage of each supercapacitor, current, watt-hours, SOC, over-charge, reverse polarity, over-temperature, short circuit, capacitor imbalance, and/or any other suitable data. In some embodiments, controller 160 relays the extracted data to one or more communication ports 164. Controller 160 and/or control logic 112 can be configured to signal an alarm if any event and/or events occur outside one or more predetermined limits.

In some embodiments, information can be provided to one or more external devices. The external devices can provide, for example, analysis of storage capacity, energy available in the storage, behavior of the storage in relation with temperature, health of the storage and life expectancy of the system, and/or other environmental conditions which results in optimizing the storage in the most efficient way. Communication with external devices can further enable monitoring and/or proactive management of energy backup available. In some embodiments, communication module 120 enables chargers communicate with system 100 to ensure critical operations and charging of system 100 in the most efficient and optimized way.

Figure 8:
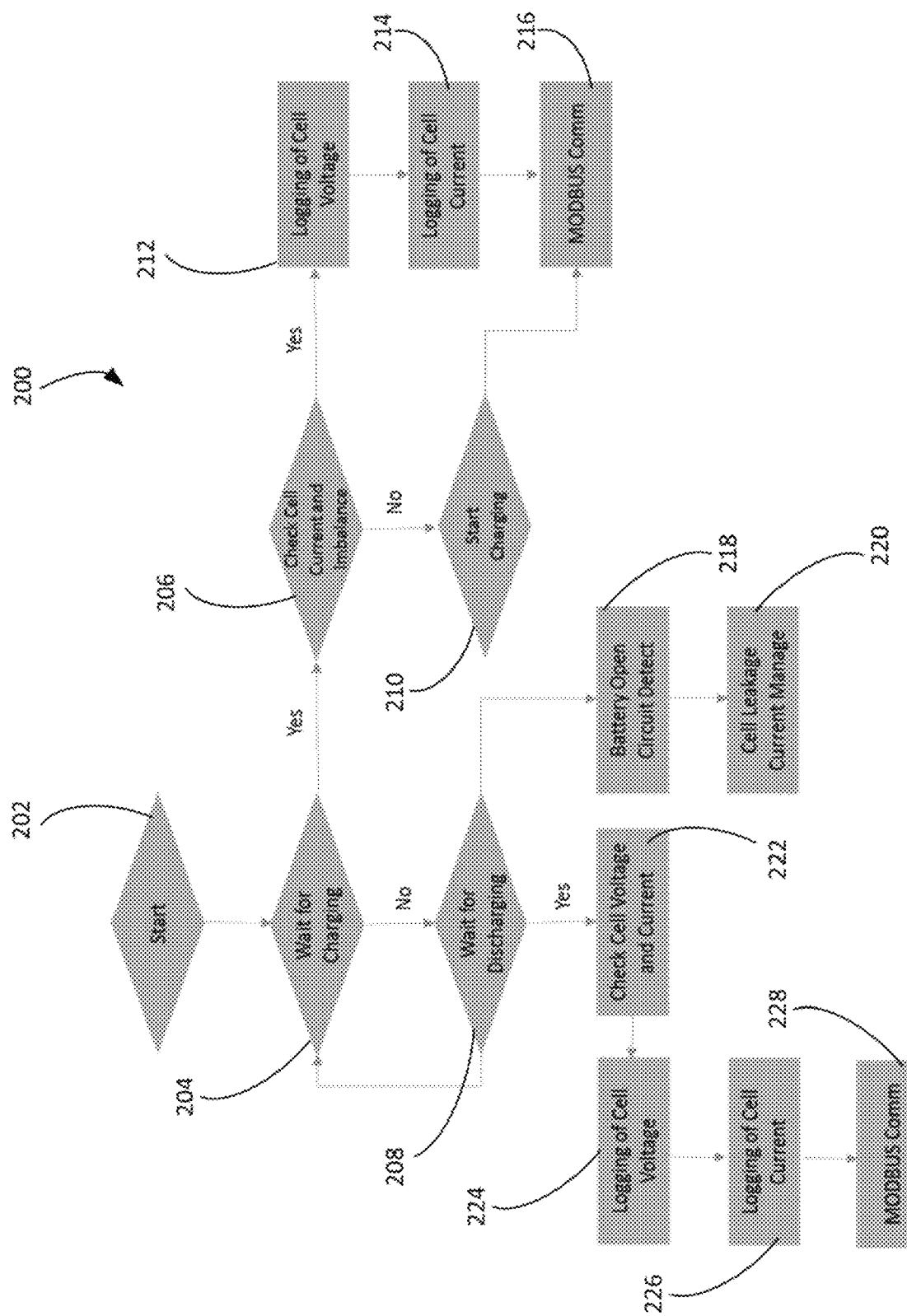
FIG. 8 is a flowchart illustrating a control algorithm, in accordance with some embodiments.

FIG. 8 is a flow diagram of one example of a control algorithm 200 that can be executed by control logic, such as control logic 112, in accordance with some embodiments. Although a specific flow diagram is illustrated herein, it will be appreciated that some steps of the control algorithm 200 can be performed in alternative orders and/or in parallel.

At block 202, the algorithm begins. At decision block 204, a decision is made to determine if charging of one of the supercapacitors 106 is needed. The decision is based on the current state of the system (e.g., coupled to a charger/not in a discharge state), current state of the supercapacitors 106 (e.g., below maximum charge level), and/or any other suitable factors. If charging of one of the supercapacitors 106 is needed, the control algorithm 200 proceeds to block 206.

At decision block 206, the control algorithm 200 determines whether the cell current and charge of the one of the supercapacitors 106 is imbalanced. As discussed above, the supercapacitor 106 can be overcharged and/or undercharged with respect to the other supercapacitors 106 in the array. If an imbalance is detected, the control algorithm 200 logs the cell voltage of the supercapacitor at block 212, the cell current of the supercapacitor 106 at block 214, and transmits the information to one or more circuit elements, such as control logic 112, at block 216. If an imbalance is not detected, the control algorithm 200 proceeds to block 210 and begins charging the supercapacitor 106.

If, at block 204, it is determined that charging of one of the supercapacitors 106 is not needed, the algorithm 200 proceeds to block 208. At decision block 208, the charge balancing algorithm 200 determines whether a supercapacitor 106 needs to be discharged. The decision can be based on one or more factors, such as current state of the system (e.g., not coupled to a charger/not in a charging state), current state of the supercapacitors 106 (e.g., currently at full charge), current state of a load (e.g., load is drawing power), and/or any other suitable factors. If discharging of one of the supercapacitors is required, the control algorithm 200 proceeds to block 222.

At block 222, the control algorithm 200 checks the cell voltage and current at records each of the cell voltage and cell current at blocks 224 and 226, respectively. The control algorithm 200 provides this information to one or more circuit elements or external elements at block 228.

If, at block 208, it is determined that discharge of one of the supercapacitors 106 is not required, the algorithm 200 proceeds to block 218. At block 218, the algorithm 200 detects the current state of one or more of the batteries 110 and activates a charge retention circuit 108 to generate a leakage current to maintain the charge on the supercapacitors 106 at block 220.

Figure 9:
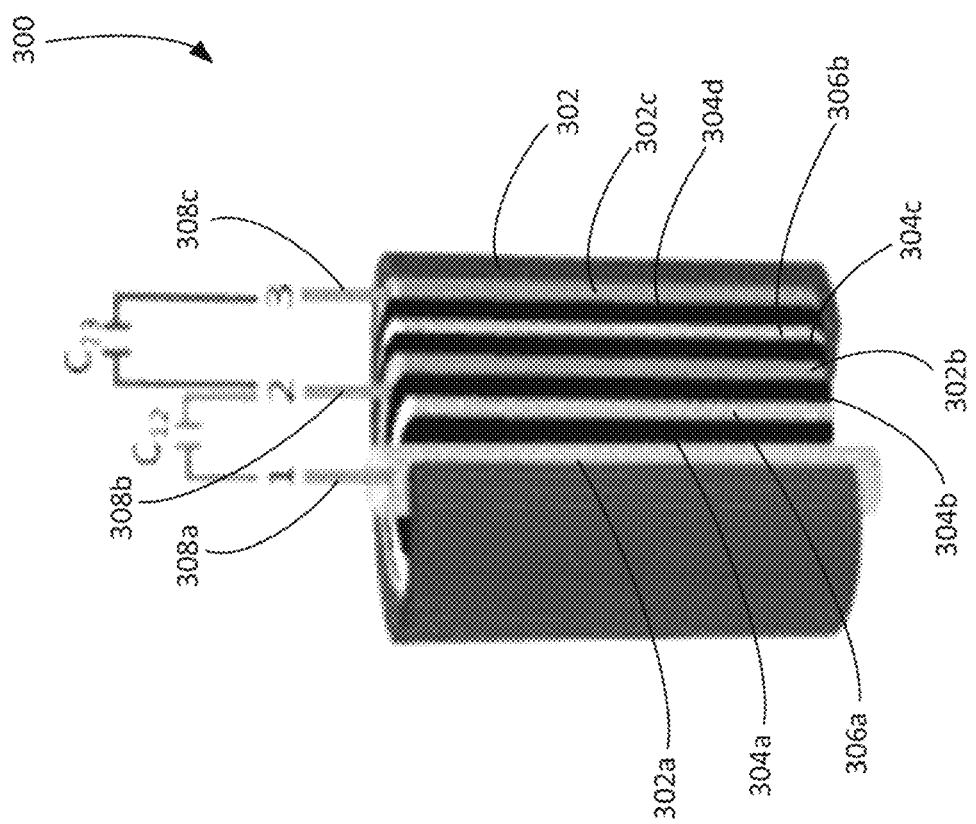
FIG. 9 illustrates a supercapacitor, in accordance with some embodiments.

In some embodiments, in order to reduce charging time and enhance specific energy of the supercapacitors 106, electrolytic layer charging is achieved at the individual supercapacitor level for each of the supercapacitors 106. FIG. 9 is an exploded view of one embodiment of a supercapacitor 300. The supercapacitor 300 includes an outer protective layer 302 surrounding a plurality of internal layers. The internal layers include one or more microwires 302, a plurality of carbon layers 304a-304d (collectively "carbon layers 304"), and a plurality of electrolytic layers 306a-306b (collectively "electrolytic layers 306"). The plurality of microwires 302, carbon layers 304, and electrolytic layers 306 can be interspersed in a predetermined pattern, as determined during manufacture of the supercapacitor 300. A plurality of lead wires 308a-308c (collectively "lead wires 308") extend axially from the microwires 302 and conductive layers 304 to capacitors $C_{12}$ and $C_{23}$.

During the charge cycle, charge control circuit 114 is constantly monitoring the voltage of supercapacitors 106. The dielectric layer is fully charged when the full charge voltage of a selected one of the supercapacitors 106 has been achieved. When this happens, charge control circuit 114 signals the external charger to disconnect the charging current and it then analyzes the voltage drop. The voltage drop indicates the state of charge of the electrolytic layer. If the voltage drop is greater than 0V, charge control circuit 114 signals the external charger to apply a rapid sequence of charge, discharge and rest pulses to the selected one of the supercapacitors 106. The charge control circuit 114 monitors the voltage drop during this process. When the charge control circuit 114 detects that the voltage drop of the selected one of supercapacitors 106 is 0V, the electrolytic layer is fully charged to its maximum available capacity, and the charge control circuit 114 signals the charger to stop charging the selected one of the supercapacitors 106. This repeated sequence of rapid charge/discharge/rest pulses on the electrolytic layer ensures that the electrolytic layer charges quicker than the charge time achieved by conventional charging methods. It also ensures that it is charged to its maximum available charge holding capacity which is higher than that achieved by conventional charging methods.

In some embodiments, similar and/or identical charge/discharge/rest pulses are applied to batteries 110 connected to each of the supercapacitors 106. The similar pulse pattern charges the batters 110 faster than by conventional charging and similarly charges the batteries 110 to a higher capacity than by conventional charging.

Figure 10:
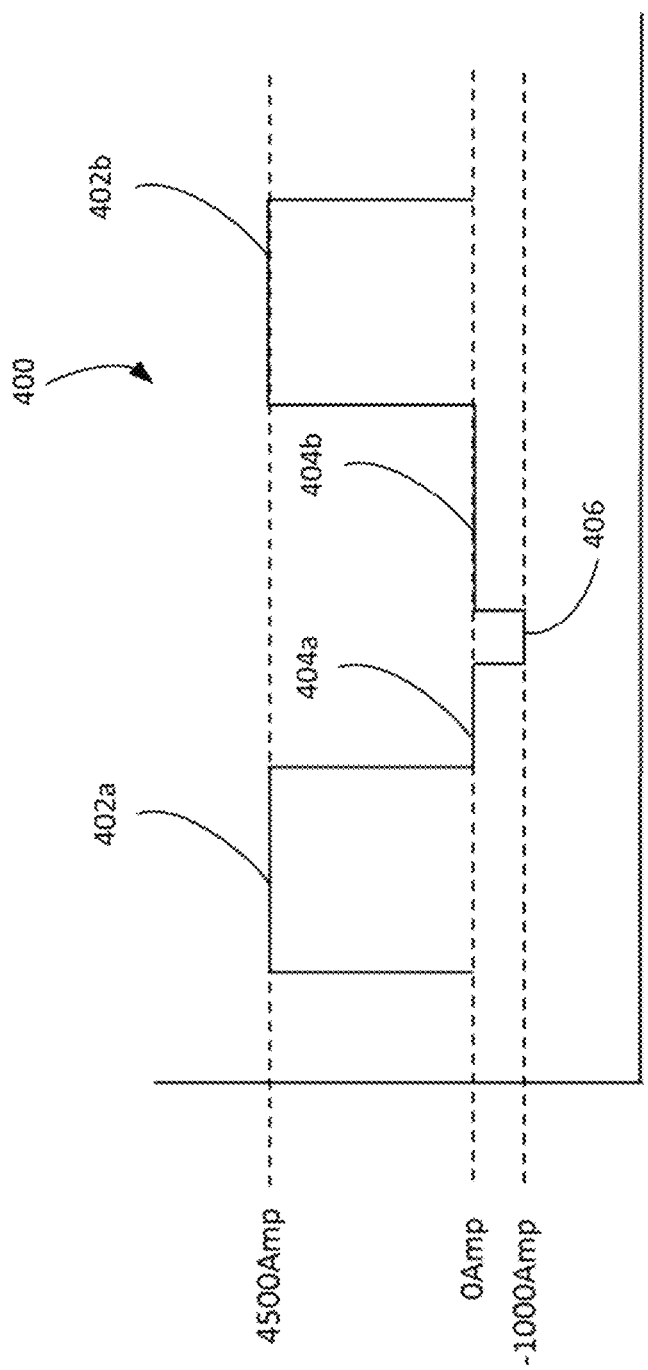
FIG. 10 is a timing diagram illustrating a charging operation of a first supercapacitor in an array of supercapacitors, in accordance with some embodiments.

FIG. 10 illustrates a timing diagram 400 showing a sequence of charge, discharge, and rest pulses for charging one of the supercapacitors 106, in accordance with some embodiments. As shown in FIG. 10, at time $t_0$, a first charging pulse 402a is applied to a supercapacitor, such as supercapacitor 106-1. The first charging pulse 402a can have any suitable current sufficient to quickly charge the supercapacitor 106-1. For example, in the illustrated embodiment, the first charging pulse has a current of about 4,500 Amps, although it will be appreciated that greater and/or lesser charging pulses can be used for other supercapacitors.

The first charge pulse 402a is maintained at the predetermined current for a predetermined time period. For example, in some embodiments, the time from $t_0$ to $t_1$ can be about 20 ms, although it will be appreciated that greater and/or lesser charge times can be used. At time $t_1$, the charge control circuit 114 transitions the charge current from the first charge pulse 402a to a first rest pulse 404a.

The first rest pulse 404a sets the charge current at 0 amps for a predetermined time period. For example, in some embodiments, the first rest pulse 404a is maintained for about half the period of the first charge pulse 402a, although it will be appreciated that longer and/or shorter rest pulses can be used. In the illustrated embodiment, the rest pulse is maintained for about 10 ms from $t_1$ to $t_2$.

At time $t_2$, a discharge pulse 406 is applied to the supercapacitor 106-1. The discharge pulse 406 is a negative current pulse that discharges a portion of the charge stored in the supercapacitor 106-1. In some embodiments, the discharge pulse 406 has a current value of about -1000 Amps, although it will be appreciated that higher and/or lower discharge current values can be used. The discharge pulse 406 is maintained for a predetermined discharge period. In the illustrated embodiment, the discharge period, from $t_2$ to $t_3$ as about 5 ms.

At time $t_3$, the charge control circuit 114 transitions the charging current to a second rest pulse 404b. The second rest pulse 404b sets the charge current at 0 amps for a predetermined time period. For example, in the illustrated embodiment, the second rest pulse is maintained for about 20 ms, from $t_3$ to $t_4$.

At time $t_4$, the charge control circuit 114 transitions the charging current to a second charge pulse 402b. The second charge pulse 402b is configured to fully charge the supercapacitor 106-1. The second charge pulse 402b is similar in current and duration to the first charge pulse 402a, although it will be appreciated that the second charge pulse can have a greater and/or lesser current value and/or duration than the first charge pulse 402a. In the illustrated embodiment, the second charge pulse 402a maintains the charging current at 4,500 Amps for 20 ms. At time $t_5$, the supercapacitor 106-1 is fully charged and the charge control circuit transitions the charging current to 0 amps.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An energy storage device, comprising:
a charge storage assembly including an array of supercapacitors;
an auxiliary storage element connected in parallel to each supercapacitor in the array of supercapacitors;
a charge control circuit configured to provide a charging current to the array of supercapacitors during a charging operation, wherein the charge control circuit is configured to selectively transfer charge between at least one supercapacitor in the array of supercapacitors and the auxiliary storage element; and
a charge retention circuit configured to maintain a charge state of each supercapacitor in the array of supercapacitors when each supercapacitor is idle.

2. The energy storage device of claim 1, comprising an imbalance detection circuit, wherein the charge control circuit is configured to transfer charge between the at least one supercapacitor and the auxiliary storage element when the imbalance detection circuit detects a charge imbalance between the at least one supercapacitor in the array and one or more remaining supercapacitors in the array.

3. The energy storage device of claim 2, wherein the imbalance detection circuit is configured to detect one of an overcharge imbalance or an undercharge imbalance, and
wherein the charge control circuit is configured to transfer charge from the at least one supercapacitor and the auxiliary storage element when an overcharge imbalance is detected, and
wherein the charge control circuit is configured to transfer charge from the auxiliary storage element to the at least one supercapacitor when an undercharge imbalance is detected.

4. The energy storage device of claim 1, wherein the charge control circuit comprises:
at least one pulse-width modulation controller; and
a plurality of insulated-gate bipolar transistors (IGBTs) electrically coupled to the at least one pulse-width modulation controller.

5. The energy storage device of claim 4, wherein the at least one pulse-width modulation controller comprises a digital signal processor and at least one IGBT controller electrically coupled to the digital signal processor and configured to generate a first control signal and a second control signal for the plurality of IGBTs.

6. The energy storage device of claim 1, wherein the charge control circuit comprises a plurality of charge control circuits, wherein each of the plurality of charge control circuits is coupled to a respective supercapacitor in the array of supercapacitors.

7. The energy storage device of claim 1, wherein the charge storage assembly comprises a plurality of batteries, wherein each of the plurality of batteries is coupled to a corresponding supercapacitor in the array of supercapacitors.

8. The energy storage device of claim 7, wherein each of the plurality of batteries comprises a lithium ion battery.

9. The energy storage device of claim 1, wherein the auxiliary storage element comprises a supercapacitor.

10. The energy storage device of claim 1, wherein the charge retention circuit is configured to generate a predetermined leakage current.

11. The energy storage device of claim 1, comprising a control logic element coupled to the charge control circuit, wherein the control logic element is configured to generate one or more control signals for the charge control circuit.

12. An energy storage device, comprising:
a charge storage assembly comprising:
an array of supercapacitors coupled in series; and
a plurality of batteries, wherein each of the plurality of batteries is electrically coupled to a corresponding supercapacitor in the array of supercapacitors; and
a plurality of charge retention circuits, wherein the plurality of charge retention circuits are connected in parallel with corresponding batteries of the plurality of batteries and configured to maintain a charge state of a supercapacitor in the array of supercapacitors that is in an idle state.

13. The energy storage device of claim 12, wherein a charge retention circuit of the plurality of charge retention circuits is configured to generate a leakage current from a selected one of the plurality of batteries associated with an idle supercapacitor, wherein the leakage current maintains the charge state of the idle supercapacitor.

14. The energy storage device of claim 12, wherein each of the plurality of batteries comprises a lithium ion battery.

15. The energy storage device of claim 12, wherein each of the plurality of charge retention circuits is coupled to a corresponding supercapacitor in the array of supercapacitors.

16. An energy storage device, comprising:
a charge storage assembly comprising:
an array of supercapacitors coupled in series;
a plurality of batteries, wherein each of the plurality of batteries is electrically coupled to a corresponding supercapacitor in the array of supercapacitors; and
a plurality of charge retention circuits, wherein each of the plurality of charge retention circuits is coupled to a corresponding supercapacitor in the array of supercapacitors, and wherein each of the plurality of charge retention circuits are configured to maintain a charge state of the corresponding supercapacitor in the array of supercapacitors when the corresponding supercapacitor is in an idle state;
an auxiliary storage element connected in parallel to each supercapacitor in the array of supercapacitors; and
a plurality of charge control circuits configured to selectively transfer charge between at least one supercapacitor in the array of supercapacitors and the auxiliary storage element.

17. The energy storage device of claim 16, comprising an imbalance detection circuit,
wherein the plurality of charge control circuits are configured to transfer charge between the at least one supercapacitor and the auxiliary storage element when the imbalance detection circuit detects a charge imbalance between the at least one supercapacitor in the array and one or more remaining supercapacitors in the array.

18. The energy storage device of claim 17, wherein the imbalance detection circuit is configured to detect one of an overcharge imbalance or an undercharge imbalance,
wherein the plurality of charge control circuits are configured to transfer charge from the at least one supercapacitor and the auxiliary storage element when an overcharge imbalance is detected, and
wherein the plurality of charge control circuits are configured to transfer charge from the auxiliary storage element to the at least one supercapacitor when an undercharge imbalance is detected.

19. The energy storage device of claim 16, wherein each charge control circuit of the plurality of charge control circuits comprises:
at least one pulse-width modulation controller; and
a plurality of insulated-gate bipolar transistors (IGBT) electrically coupled to the at least one pulse-width modulation controller.

* * * * *